US010367182B2

(12) United States Patent
Ogata et al.

(10) Patent No.: US 10,367,182 B2
(45) Date of Patent: *Jul. 30, 2019

(54) LAMINATED BODY

(71) Applicant: Sumitomo Chemical Company, Limited, Tokyo (JP)

(72) Inventors: Toshihiko Ogata, Osaka (JP); Takahiro Matsuo, Niihama (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 15/627,556

(22) Filed: Jun. 20, 2017

(65) Prior Publication Data

US 2017/0365831 A1  Dec. 21, 2017

(30) Foreign Application Priority Data

Jun. 21, 2016  (JP) .................. 2016-123052

(51) Int. Cl.
| | |
|---|---|
| *B32B 3/26* | (2006.01) |
| *H01M 2/16* | (2006.01) |
| *B32B 27/08* | (2006.01) |
| *B32B 27/30* | (2006.01) |
| *B32B 27/32* | (2006.01) |

(52) U.S. Cl.
CPC ............. *H01M 2/1686* (2013.01); *B32B 3/26* (2013.01); *B32B 27/08* (2013.01); *B32B 27/304* (2013.01); *B32B 27/32* (2013.01); *H01M 2/1653* (2013.01)

(58) Field of Classification Search
CPC ......... H01M 2/1686; B32B 3/26; B32B 27/32
See application file for complete search history.

(56) References Cited

U.S. PATENT DOCUMENTS

| 3,931,446 A | 1/1976 | Murayama et al. |
|---|---|---|
| 5,051,183 A | 9/1991 | Takita et al. |
| 7,208,555 B2 | 4/2007 | Tada et al. |

(Continued)

FOREIGN PATENT DOCUMENTS

| CN | 1933923 A | 3/2007 |
|---|---|---|
| EP | 0834941 A1 | 4/1998 |

(Continued)

OTHER PUBLICATIONS

Office Action dated Aug. 18, 2017 in KR Application No. 10-2017-0041366.

(Continued)

*Primary Examiner* — Matthew J Merkling
(74) *Attorney, Agent, or Firm* — Panitch Schwarze Belisario & Nadel LLP

(57) ABSTRACT

A laminated body includes: a porous base material containing a polyolefin-based resin as a main component, the porous base material having a predetermined phase difference and porosity; and a porous layer disposed on at least one surface of the porous base material, the porous layer containing a polyvinylidene fluoride-based resin, the polyvinylidene fluoride-based resin containing crystal form α in an amount of not less than 34 mol % with respect to 100 mol % of a total amount of the crystal form α and crystal form β contained in the polyvinylidene fluoride-based resin.

7 Claims, 1 Drawing Sheet

(56) References Cited

U.S. PATENT DOCUMENTS

| | | | |
|---|---|---|---|
| 8,931,647 B2 | 1/2015 | Shiki et al. | |
| 9,508,975 B1 * | 11/2016 | Matsuo | H01M 2/1653 |
| 10,074,840 B2 | 9/2018 | Honda et al. | |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2010/0285341 A1 | 11/2010 | Yun et al. | |
| 2011/0212358 A1 * | 9/2011 | Usami | B32B 5/32 429/145 |
| 2011/0305940 A1 * | 12/2011 | Usami | B29C 44/04 429/144 |
| 2013/0089770 A1 | 4/2013 | Nishikawa | |
| 2013/0095365 A1 | 4/2013 | Nishikawa | |
| 2013/0196208 A1 | 8/2013 | Nemoto | |
| 2014/0178741 A1 | 6/2014 | Hasegawa et al. | |
| 2014/0272505 A1 * | 9/2014 | Yoon | H01M 2/1646 429/94 |
| 2014/0363726 A1 | 12/2014 | Honda et al. | |
| 2015/0180002 A1 * | 6/2015 | Nishikawa | H01M 2/1686 429/144 |
| 2015/0188108 A1 | 7/2015 | Miyazawa et al. | |
| 2015/0263325 A1 | 9/2015 | Honda et al. | |
| 2017/0033347 A1 | 2/2017 | Murakami et al. | |
| 2017/0033348 A1 | 2/2017 | Murakami et al. | |
| 2017/0036832 A1 | 2/2017 | Omura et al. | |
| 2017/0098809 A1 * | 4/2017 | Ogata | H01M 2/1653 |
| 2017/0141373 A1 | 5/2017 | Murakami et al. | |
| 2017/0170443 A1 | 6/2017 | Murakami et al. | |
| 2017/0365831 A1 | 12/2017 | Ogata et al. | |
| 2017/0365832 A1 | 12/2017 | Ogata et al. | |
| 2017/0365833 A1 | 12/2017 | Ogata et al. | |
| 2017/0365834 A1 | 12/2017 | Ogata et al. | |
| 2017/0365878 A1 | 12/2017 | Ogata et al. | |

FOREIGN PATENT DOCUMENTS

| | | |
|---|---|---|
| JP | S5117274 A | 2/1976 |
| JP | H06-104736 B2 | 12/1994 |
| JP | H1140129 A | 2/1998 |
| JP | H1186844 A | 3/1999 |
| JP | H11300180 A | 11/1999 |
| JP | 2001-118558 A | 4/2001 |
| JP | 2005179562 A | 7/2005 |
| JP | 2005200623 A | 7/2005 |
| JP | 2005343957 A | 12/2005 |
| JP | 2008062229 A | 3/2008 |
| JP | 4247027 B2 | 4/2009 |
| JP | 2009104967 A | 5/2009 |
| JP | 2009185093 A | 8/2009 |
| JP | 2009-256404 A | 11/2009 |
| JP | 2010-540744 A | 12/2010 |
| JP | 201346998 A | 3/2013 |
| JP | 5355823 B1 | 11/2013 |
| JP | 5432417 B2 | 3/2014 |
| JP | 5553165 B2 | 7/2014 |
| JP | 2015111461 A | 6/2015 |
| JP | 2016-040354 A | 3/2016 |
| JP | 2016051695 A | 4/2016 |
| JP | 5932161 B2 | 6/2016 |
| KR | 10-2006-0072065 A | 6/2006 |
| KR | 10-2006-0101541 A | 9/2006 |
| KR | 10-2006-0118668 A | 11/2006 |
| KR | 10-2009-0037552 A | 4/2009 |
| KR | 10-2013-0031319 A | 3/2013 |
| KR | 10-2013-0036043 A | 4/2013 |
| KR | 101430975 B1 | 8/2014 |
| KR | 10-2014-0112668 A | 9/2014 |
| KR | 10-2014-0113186 A | 9/2014 |
| KR | 101479749 B1 | 1/2015 |
| KR | 20150020667 A | 2/2015 |
| KR | 10-1510972 B1 | 4/2015 |
| KR | 20160002173 A | 1/2016 |
| KR | 20160038918 A | 4/2016 |
| WO | 2007119850 A1 | 10/2007 |
| WO | 2008018181 A1 | 2/2008 |
| WO | 2012137375 A1 | 10/2012 |
| WO | 2013073503 A1 | 5/2013 |
| WO | 2013099539 A1 | 7/2013 |
| WO | 2016152863 A1 | 9/2016 |

OTHER PUBLICATIONS

Office Action dated Oct. 22, 2018 in U.S. Appl. No. 15/627,671 by Ogata.

Office Action dated Aug. 18, 2017 in KR Application No. 10-2017-0041611.

Mohammadi et al., "Effect of Tensile Strain Rate and Elongation on Crystalline Structure and Piezoelectric Properties of PVDF Thin Films", Polymer Testing, vol. 26, pp. 42-50 (2007).

Office Action dated Aug. 18, 2017 in KR Application No. 10-2017-0041595.

Office Action dated Jul. 29, 2016 in KR Application No. 1020160077240.

Office Action dated Jun. 28, 2016 in JP Application No. 2016024163.

Office Action dated Nov. 29, 2016 in JP Application No. 2016-024163.

Office Action dated Dec. 21, 2016 in KR Application No. 10-2016-0077240.

Office Action dated Apr. 19, 2017 in KR Application No. 10-2016-0077240.

Martins et al, "Electroactive Phases of Poly(Vinylidene Fluoride): Determination, Processing, and Applications," Progress in Polymer Science, vol. 39, pp. 683-706 (2014).

Office Action dated May 16, 2017 in JP Application No. 2017033720.

Office Action dated Mar. 28, 2018 in CN Application No. 201610865635.7.

Office Action dated Oct. 22, 2018 in U.S. Appl. No. 15/627,664 by Ogata.

Office Action dated Aug. 18, 2017 KR Application No. 10-2017-0041604.

Office Action dated Sep. 20, 2018 in U.S. Appl. No. 15/627,629, by Ogata.

Office Action dated Dec. 20, 2018 in U.S. Appl. No. 15/627,585, by Ogata.

Office Action dated Dec. 31, 2018 in U.S. Appl. No. 15/627,736, by Ogata.

Office Action dated Apr. 10, 2019 in U.S. Appl. No. 15/627,585, by Ogata.

* cited by examiner

LAMINATED BODY

This Nonprovisional application claims priority under 35 U.S.C. § 119 on Patent Application No. 2016-123052 filed in Japan on Jun. 21, 2016, the entire contents of which are hereby incorporated by reference.

TECHNICAL FIELD

The present invention relates to a laminated body, and more specifically, to a laminated body usable as a separator for a nonaqueous electrolyte secondary battery (hereinafter referred to as a "nonaqueous electrolyte secondary battery separator").

BACKGROUND ART

Nonaqueous electrolyte secondary batteries such as a lithium-ion secondary battery have a high energy density, and are thus in wide use as batteries for devices such as a personal computer, a mobile telephone, and a portable information terminal. Such nonaqueous electrolyte secondary batteries have recently been developed as on-vehicle batteries.

In a nonaqueous electrolyte secondary battery, the electrodes expand and contract repeatedly as the nonaqueous electrolyte secondary battery is charged and discharged. The electrodes and the separator thus cause stress on each other. This, for example, causes the electrode active materials to be lost and consequently increases the internal resistance, unfortunately resulting in a degraded cycle characteristic. In order to address this problem, there has been proposed a technique of coating the surface of a separator with an adhesive material such as polyvinylidene fluoride for increased adhesiveness between the separator and electrodes (see Patent Literatures 1 and 2). Coating a separator with an adhesive material, however, causes the separator to curl visibly. A curled separator cannot be handled easily during production, which may unfortunately lead to problems during battery preparation such as defective rolling and defective assembly.

CITATION LIST

Patent Literature

[Patent Literature 1]
International Publication No. 2013/073503 (Publication date: May 23, 2013)
[Patent Literature 2]
Japanese Patent Application Publication, Tokukai, No. 2001-118558 (Publication date: April 27, 2001)

SUMMARY OF INVENTION

Technical Problem

The present invention has been accomplished in view of the above issue. It is an object of the present invention to sufficiently prevent a separator from curling.

Solution to Problem

The inventors of the present invention have discovered that a separator capable of sufficiently preventing curling can be produced by using, as a nonaqueous electrolyte secondary battery separator, a laminated body including (i) a porous base material containing a polyolefin-based resin as a main component and (ii) a porous layer disposed on the porous base material which porous layer contains a polyvinylidene fluoride-based resin (hereinafter also referred to as "PVDF-based resin"), the polyvinylidene fluoride-based resin having suitably controlled crystal forms. The inventors of the present invention also discovered the following with regard to a porous base material which is not an optical component, which porous base material is included in a laminated body usable as a nonaqueous electrolyte secondary battery separator. Specifically, in a case where such a porous base material is used in a nonaqueous electrolyte secondary battery, an internal resistance of the nonaqueous electrolyte secondary battery, as observed immediately after battery assembly, becomes lower as a phase difference of the porous base material is smaller with respect to light having a wavelength of 590 nm.

A laminated body in accordance with an embodiment of the present invention includes: a porous base material containing a polyolefin-based resin as a main component; and a porous layer disposed on at least one surface of the porous base material, the porous layer containing a polyvinylidene fluoride-based resin, the porous base material having (i) a phase difference of not more than 80 nm with respect to light with a wavelength of 590 nm in a state where the porous base material is impregnated with ethanol and (ii) a porosity within a range of 30% to 60%, the polyvinylidene fluoride-based resin containing crystal form α in an amount of not less than 34 mol % with respect to 100 mol % of a total amount of the crystal form α and crystal form β contained in the polyvinylidene fluoride-based resin.

The amount of crystal form α is calculated from an absorption intensity at around 765 cm$^{-1}$ in an IR spectrum of the porous layer, while an amount of crystal form β is calculated from an absorption intensity at around 840 cm$^{-1}$ in the IR spectrum of the porous layer.

A laminated body in accordance with an embodiment of the present invention may preferably be arranged such that the polyvinylidene fluoride-based resin includes (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

A laminated body in accordance with an embodiment of the present invention may preferably be arranged such that the polyvinylidene fluoride-based resin has a weight-average molecular weight of not less than 200,000 and not more than 3,000,000.

A laminated body in accordance with an embodiment of the present invention may preferably be arranged such that the porous layer contains a filler.

The laminated body in accordance with an embodiment of the present invention may preferably be arranged such that the filler has a volume-average particle size of not less than 0.01 μm and not more than 10 μm.

A member for a nonaqueous electrolyte secondary battery (hereinafter referred to as a "nonaqueous electrolyte secondary battery member") in accordance with an embodiment of the present invention includes: a cathode; the laminated body; and an anode, the cathode, the laminated body, and the anode being arranged in this order.

A nonaqueous electrolyte secondary battery in accordance with an embodiment of the present invention includes the above laminated body as a separator.

Advantageous Effects of Invention

An embodiment of the present invention can prevent curling.

DESCRIPTION OF EMBODIMENTS

Figure 1:
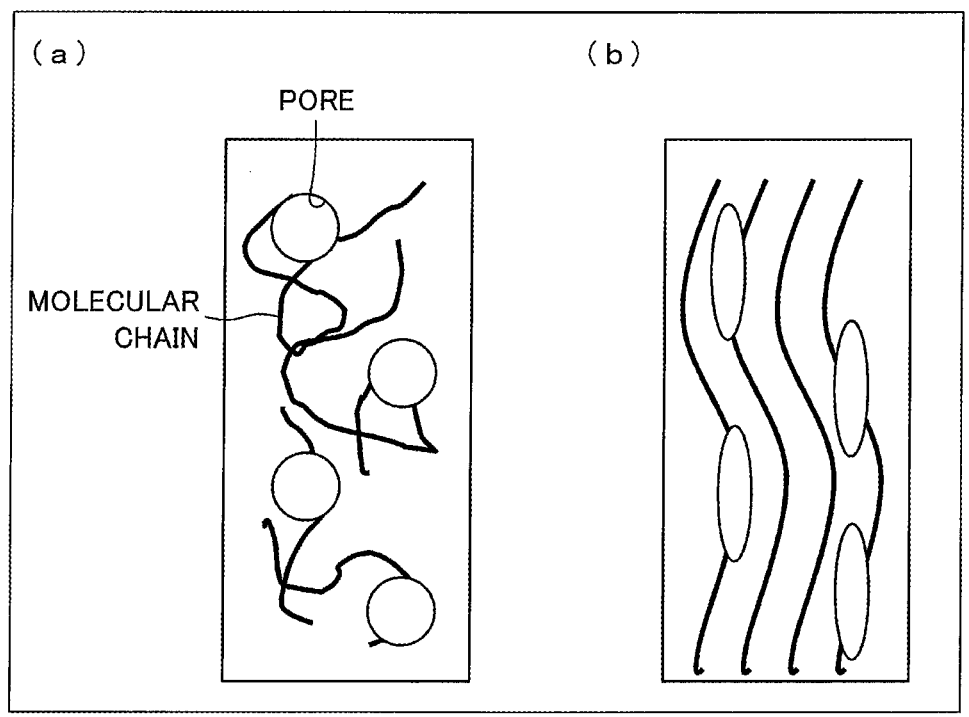
FIG. 1 is a view illustrating a relationship between (i) a molecular chain and a pore in a resin constituting a porous base material and (ii) a phase difference.

The following description will discuss an embodiment of the present invention. The present invention is, however, not limited to the embodiment below. The present invention is not limited to the arrangements described below, but may be altered in various ways by a skilled person within the scope of the claims. Any embodiment based on a proper combination of technical means disclosed in different embodiments is also encompassed in the technical scope of the present invention. Note that numerical expressions such as "A to B" herein mean "not less than A and not more than B" unless otherwise stated.

[1. Laminated Body]

A laminated body in accordance with an embodiment of the present invention includes: a porous base material containing a polyolefin-based resin as a main component; and a porous layer on at least one surface of the porous base material, the porous layer containing a polyvinylidene fluoride-based resin, the porous base material having (i) a phase difference of not more than 80 nm with respect to light with a wavelength of 590 nm in a state where the porous base material is impregnated with ethanol and (ii) a porosity within a range of 30% to 60%, the polyvinylidene fluoride-based resin containing crystal form α in an amount of not less than 34 mol % with respect to 100 mol % of a total amount of the crystal form α and crystal form β contained in the polyvinylidene fluoride-based resin.

The amount of crystal form α is calculated from an absorption intensity at around 765 $cm^{-1}$ in an IR spectrum of the porous layer, while an amount of crystal form ⊕ is calculated from an absorption intensity at around 840 $cm^{-1}$ in the IR spectrum of the porous layer.

(1-1) Porous Base Material

The porous base material used in an embodiment of the present invention is (i) a base material of a laminated body in accordance with an embodiment of the present invention and (ii) a porous film included in a nonaqueous electrolyte secondary battery and disposed between the cathode and the anode. The porous base material contains a polyolefin-based resin as a main component. The porous base material has (i) a phase difference of not more than 80 nm with respect to light with a wavelength of 590 nm in a state where the porous base material is impregnated with ethanol and (ii) a porosity within a range of 30% to 60%.

The porous base material only needs to be a base material that (i) is porous and filmy, and (ii) contains a polyolefin-based resin as a main component (such a base material also called a polyolefin-based porous base material or a polyolefin-based resin microporous film). The porous base material is a film that (i) has therein pores connected to one another and (ii) allows a gas and/or a liquid to pass therethrough from one surface to the other.

The porous base material is arranged such that in a case where the battery generates heat, the porous base material is melted so as to make the laminated body (which can be used as a nonaqueous electrolyte secondary battery separator) non-porous. This allows the porous base material to impart a shutdown function to the laminated body. The porous base material may include a single layer or a plurality of layers. Note that in the present specification, a nonaqueous electrolyte secondary battery separator may also be referred to simply as a "separator".

The porous base material may have any film thickness that is selected as appropriate in view of the thickness of a nonaqueous electrolyte secondary battery member to be included in a nonaqueous electrolyte secondary battery to be produced. The porous base material has a film thickness of preferably 4 μm to 40 μm, more preferably 5 μm to 30 μm, and further preferably 6 μm to 15 μm.

The porous base material has a volume-based porosity of 30% to 60%, and preferably 40% to 60%, in order to allow the non-aqueous secondary battery separator to (i) retain a larger amount of electrolyte and (ii) achieve a function of reliably preventing (shutting down) a flow of an excessively large current at a lower temperature. Further the porous base material has pores each having an average pore size (average pore diameter) of preferably not larger than 0.3 μm, more preferably not larger than 0.14 μm. This is so that the laminated body can obtain sufficient ion permeability and prevent particles from entering the cathode and/or the anode in a case where the laminated body containing the porous base material is used as a separator.

The porous base material has a phase difference of 80 nm or less with respect to light having a wavelength of 590 nm in a state where the porous base material is impregnated with ethanol. The phase difference of the porous base material is preferably not less than 5 nm and not greater than 80 nm, and more preferably not less than 20 nm and not greater than 80 nm. Note that the porous base material has a birefringent index of preferably 0.004 or less, more preferably not less than 0.001 and not greater than 0.004, and further preferably not less than 0.002 and not greater than 0.004.

In a case where refractive indices of light are different between an x axis direction and a y axis direction of a surface of the porous base material which x axis direction and y axis direction are orthogonal to each other, that is, a case where the porous base material has birefringence, the birefringence causes a phase difference between the x axis direction and the y axis direction, with respect to light that (i) has entered from a normal direction of the surface of the porous base material and (ii) has passed through the porous base material. Such a phase difference is a physical property which is the focus of attention in a case where the porous base material is used as an optical component. However, the inventors of the present invention discovered that, in a nonaqueous electrolyte secondary battery including, as a electrolyte secondary battery separator, a laminated body including a porous base material which is not an optical component, a smaller phase difference in the porous base material correlates to a lower internal resistance in the nonaqueous electrolyte secondary battery immediately after assembly of the battery.

That is, as described above, the inventors of the present invention have focused on the fact that, in a case where (i) a porous base material has a volume-based porosity of 30% to 60% in order to retain a larger amount of electrolyte, (ii) a nonaqueous electrolyte secondary battery, in which a laminated body including the porous base material is used as a nonaqueous electrolyte secondary battery separator, is assembled, and (iii) an electrolyte is injected into the nonaqueous electrolyte secondary battery, an internal resistance of the nonaqueous electrolyte secondary battery varies depending on a speed at which the electrolyte permeates through the nonaqueous electrolyte secondary battery separator constituted by the laminated body. Then, as described above, the inventors of the present invention found that, in a case where a phase difference of the porous base material with respect to light having a wavelength of 590 nm is controlled to be 80 nm or less, the electrolyte permeates through the nonaqueous electrolyte secondary battery separator, constituted by the laminated body including the porous base material, at a higher speed when the nonaqueous electrolyte secondary battery, including the laminated body containing the porous base material, is assembled, and this allows the nonaqueous electrolyte secondary battery to have a lower internal resistance.

A phase difference of a porous base material depends on a structure of a molecular chain and a pore in a resin constituting the porous base material. FIG. 1 is a view schematically illustrating a relationship between a phase difference and a structure of a porous base material. (a) of FIG. 1 illustrates a structure of a porous base material whose phase difference is relatively small. (b) of FIG. 1 illustrates a structure of a porous base material whose phase difference is relatively large. As illustrated in (a) of FIG. 1, in the porous base material having a small phase difference, molecular chains and pores in a resin constituting the porous base material are irregularly arranged and there is almost no anisotropy. Meanwhile, as illustrated in (b) of FIG. 1, in the porous base material having a large phase difference, molecular chains are orientated in a specific direction and pores have shapes extending in an identical direction.

In a case where the nonaqueous electrolyte secondary battery is assembled, the laminated body which can be used as the nonaqueous electrolyte secondary battery separator is immersed in an electrolyte in a state where the nonaqueous electrolyte secondary battery separator is sandwiched between a cathode sheet and an anode sheet. This causes the nonaqueous electrolyte secondary battery separator, constituted by the laminated body containing the porous base material, to absorb the electrolyte from an end surface of the nonaqueous electrolyte secondary battery separator.

In doing so, in a case where the laminated body contains the porous base material illustrated in (b) of FIG. 1, the electrolyte is more likely to be absorbed in an orientation direction of the molecular chains, whereas the electrolyte is less likely to be absorbed in a direction perpendicular to the orientation direction of the molecular chains. Therefore, the electrolyte is mainly absorbed from an end surface of the nonaqueous electrolyte secondary battery separator which end surface is perpendicular to the orientation direction of the molecular chains, and the electrolyte thus absorbed permeates, in the orientation direction, through the nonaqueous electrolyte secondary battery separator. As a result, it takes time until the electrolyte permeates through the entire nonaqueous electrolyte secondary battery separator.

Meanwhile, in a case where the laminated body contains the porous base material illustrated in (a) of FIG. 1, since the pores are irregularly arranged, the electrolyte can be absorbed by any of end surfaces. This allows the electrolyte to permeate through the entire nonaqueous electrolyte secondary battery separator, constituted by the laminated body, in a short time.

Therefore, in a nonaqueous electrolyte secondary battery in which a laminated body containing such a porous base material is used as a nonaqueous electrolyte secondary battery separator, as a phase difference of a porous base material is smaller, it is possible for the nonaqueous electrolyte secondary battery to have a lower internal resistance immediately after the nonaqueous electrolyte secondary battery has been assembled.

A porous base material in accordance with an embodiment of the present invention contains a polyolefin-based resin as a main component. That is, the porous base material necessarily contains a polyolefin-based resin at a proportion of 50% or more by volume with respect to the entirety of the porous base material. Such a proportion of the polyolefin-based resin is preferably not less than 90% by volume, and more preferably not less than 95% by volume. The polyolefin-based resin of the porous base material preferably contains a high molecular weight component having a weight-average molecular weight of $5\times10^5$ to $15\times10^6$. In particular, the polyolefin-based resin of the porous base material preferably has a weight-average molecular weight of not less than 1,000,000. This is because such a polyolefin-based resin imparts higher strength to the porous base material and to the entirety of a nonaqueous electrolyte secondary battery separator constituted by a laminated body containing the porous base material.

Examples of the polyolefin-based resin constituting the porous base material include high molecular weight homopolymers or copolymers produced through polymerization of ethylene, propylene, 1-butene, 4-methyl-1-pentene, 1-hexene, and/or the like. The porous base material can include a layer containing only one of these polyolefin-based resins and/or a layer containing two or more of these polyolefin-based resins. The polyolefin-based resin is, in particular, preferably a high molecular weight polyethylene containing ethylene as a main component. The porous base material may contain a component(s) other than polyolefin as long as such a component does not impair the function of the layer.

The porous base material has an air permeability within a range of normally 30 seconds/100 cc to 500 seconds/100 cc, and preferably 50 seconds/100 cc to 300 seconds/100 cc, in terms of Gurley values. A porous base material having such an air permeability makes it possible to achieve sufficient ion permeability when a laminated body including the porous base material is used as a separator.

The porous base material has normally a weight per unit area of 4 g/m$^2$ to 20 g/m$^2$, and preferably 4 g/m$^2$ to 12 g/m$^2$, because such a weight per unit area can increase (i) a strength, a thickness, ease of handling, and a weight of the laminated body and (ii) a weight energy density and a volume energy density of a nonaqueous electrolyte secondary battery including the laminated body as a nonaqueous electrolyte secondary battery separator.

(1-2) Method for Producing Porous Base Material

The following description will discuss a method for producing a porous base material.

First, a resin composition which serves as a raw material of the porous base material is produced. For example, a polyolefin resin composition is obtained by kneading (i) an ultra-high molecular weight polyethylene, (ii) a low molecular weight polyethylene having a weight-average molecular weight of 10,000 or less, (iii) a pore forming agent such as calcium carbonate or a plasticizing agent, and (iv) an antioxidant.

Subsequently, the polyolefin resin composition is rolled by a pair of reduction rolls, and is then gradually cooled while being pulled by a winding roll which rotates at a speed different from that of the pair of reduction rolls, so that the polyolefin resin composition is shaped into a sheet. A pore forming agent is then removed from the sheet thus obtained, and the sheet is stretched at a predetermined stretch ratio.

Note that it is possible to control a phase difference of the porous base material by appropriately changing (i) a roll-draw ratio (a winding roll speed/a reduction roll speed) which is a ratio between a rotation speed of a winding roll and a rotation speed of reduction rolls and (ii) the stretch ratio.

(1-3) Hydrophilization Treatment of Porous Base Material

A laminated body in accordance with an embodiment of the present invention includes, on the porous base material, a later-described porous layer containing a polyvinylidene fluoride-based resin. The laminated body may further include one or more publicly known porous layers, such as an adhesive layer, a heat-resistant layer, and a protective layer, as another porous layer.

During production of the laminated body in accordance with an embodiment of the present invention, that is, when the porous layer is to be disposed on the porous base material, the porous base material is more preferably subjected to a hydrophilization treatment before a porous layer is formed, that is, before the porous base material is coated with a coating solution (described later). Performing a hydrophilization treatment on the porous base material further improves the ease with which the coating solution can be applied and thus allows a more uniform porous layer to be formed. The hydrophilization treatment is effective in a case where water accounts for a high proportion of a solvent (dispersion medium) contained in the coating solution.

Specific examples of the hydrophilization treatment include publicly known treatments such as (i) a chemical treatment involving an acid, an alkali, or the like, (ii) a corona treatment, and (iii) a plasma treatment. Among these hydrophilization treatments, the corona treatment is more preferable because the corona treatment makes it possible not only to hydrophilize the porous base material within a relatively short time period, but also to hydrophilize only a surface and its vicinity of the porous base material to leave the inside of the porous base material unchanged in quality.

(1-4) Porous Layer

The porous layer used in an embodiment of the present invention contains a polyvinylidene fluoride-based resin, the polyvinylidene fluoride-based resin containing crystal form $\alpha$ in an amount of not less than 34 mol % with respect to 100 mol % of the total amount of the crystal form $\alpha$ and crystal form $\beta$ contained in the polyvinylidene fluoride-based resin.

The amount of crystal form $\alpha$ is calculated from an absorption intensity at around 765 $cm^{-1}$ in an IR spectrum of the porous layer, while an amount of crystal form $\beta$ is calculated from an absorption intensity at around 840 $cm^{-1}$ in the IR spectrum of the porous layer.

The porous layer used in an embodiment of the present invention contains a polyvinylidene fluoride-based resin (PVDF-based resin). The porous layer has therein a large number of pores connected to one another, and thus allows a gas or a liquid to pass therethrough from one surface to the other. Further, in a case where the porous layer used in an embodiment of the present invention is used as a constituent member of a nonaqueous electrolyte secondary battery separator, the porous layer can be a layer capable of adhering to an electrode as the outermost layer of the separator.

Examples of the PVDF-based resin include homopolymers of vinylidene fluoride (that is, polyvinylidene fluoride); copolymers (for example, polyvinylidene fluoride copolymer) of vinylidene fluoride and other monomer(s) polymerizable with vinylidene fluoride; and mixtures of the above polymers. Examples of the monomer polymerizable with vinylidene fluoride include hexafluoropropylene, tetrafluoroethylene, trifluoroethylene, trichloroethylene, and vinyl fluoride. The present invention can use (i) one kind of monomer or (ii) two or more kinds of monomers selected from above. The PVDF-based resin can be synthesized through emulsion polymerization or suspension polymerization.

The PVDF-based resin contains vinylidene fluoride, as a component, at a proportion of normally not less than 85 mol %, preferably not less than 90 mol %, more preferably not less than 95 mol %, further preferably not less than 98 mol %, with respect to 100 mol % of the total amount of components in the PVDF-based resin. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and 1.5 mol % or less or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous base material layer) included in a nonaqueous electrolyte secondary battery separator, with the result of a higher peel strength between the two layers, than a porous layer not containing one of the two kinds of PVDF-based resins. The first resin and the second resin are preferably mixed at a mixing ratio (mass ratio, first resin : second resin) of 15:85 to 85:15.

The PVDF-based resin has a weight-average molecular weight that is preferably 200,000 to 3,000,000. A PVDF-based resin having a weight-average molecular weight of not less than 200,000 tends to allow a porous layer to attain a mechanical property enough for the porous layer to endure a process of adhering the porous layer to an electrode, thereby allowing the porous layer and the electrode to adhere to each other sufficiently. A PVDF-based resin having a weight-average molecular weight of not more than 3,000,000 tends to not cause the coating solution, which is to be applied to form a porous layer, to have too high a viscosity, which allows the coating solution to have excellent shaping easiness. The weight-average molecular weight of the PVDF-based resin is more preferably 200,000 to 2,000,000, and further preferably 500,000 to 1,500,000.

The PVDF-based resin has a fibril diameter that is preferably 10 nm to 1000 nm in view of the cycle characteristic of a nonaqueous electrolyte secondary battery containing the porous layer.

The porous layer used an embodiment of the present invention may contain a resin other than the PVDF-based resin. Examples of the other resin include styrene-butadiene copolymers; homopolymers or copolymers of vinyl nitriles such as acrylonitrile and methacrylonitrile; and polyethers such as polyethylene oxide and polypropylene oxide.

The porous layer of an embodiment of the present invention may contain a filler. The filler may be an inorganic or organic filler. In a case where the porous layer of an embodiment of the present invention contains a filler, the filler is contained at a proportion of preferably not less than 1% by mass and not more than 99% by mass, more preferably not less than 10% by mass and not more than 98% by mass, with respect to the total amount of the polyvinylidene fluoride-based resin and the filler combined. Containing a filler allows a separator including the porous layer to have improved slidability and heat resistance, for example. The filler may be any inorganic or organic filler that is stable in a nonaqueous electrolyte and that is electrochemically stable. The filler preferably has a heat-resistant temperature of not lower than 150° C. to ensure safety of the battery.

Examples of the organic filler include: crosslinked polymethacrylic acid esters such as crosslinked polyacrylic acid, crosslinked polyacrylic acid ester, crosslinked polymethacrylic acid, and crosslinked polymethyl methacrylate; fine particles of crosslinked polymers such as crosslinked poly silicone, crosslinked polystyrene, crosslinked polydivinyl benzene, a crosslinked product of a styrene-divinylbenzene copolymer, polyimide, a melamine resin, a phenol resin, and a benzoguanamine-formaldehyde condensate; and fine particles of heat-resistant polymers such as polysulfone, polyacrylonitrile, polyaramid, polyacetal, and thermoplastic polyimide.

A resin (polymer) contained in the organic filler may be a mixture, a modified product, a derivative, a copolymer (a random copolymer, an alternating copolymer, a block copolymer, or a graft copolymer), or a crosslinked product of any of the molecular species listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia, and hydrates thereof; carbonates such as calcium carbonate and magnesium carbonate; sulfates such as barium sulfate and calcium sulfate; and clay minerals such as calcium silicate and talc. Among these inorganic fillers, a metal hydroxide, a hydrate of a metal oxide, and a carbonate are preferable in terms of battery safety enhancement such as imparting fire retardance. A metal oxide is preferable in terms of insulation and oxidation resistance. While alumina, which is a metal oxide, has many crystal forms such as α-alumina, β-alumina, γ-alumina, and θ-alumina, any of the crystal forms can be used suitably. Among the above crystal forms, α-alumina is the most preferable because it is particularly high in thermal stability and chemical stability.

The present invention may use (i) only one filler or (ii) two or more kinds of fillers in combination. Alternatively, the organic filler(s) and the inorganic filler(s) may be used in combination.

The filler has a volume average particle size of preferably 0.01 μm to 10 μm in order to ensure (i) favorable adhesion and favorable slidability and (ii) shaping easiness of the laminated body. The volume average particle size has a lower limit of more preferably not less than 0.05 μm, further preferably not less than 0.1 μm. The volume average particle size has an upper limit of more preferably not more than 5 μm, further preferably not more than 1 μm.

The filler may have any shape. The filler may, for example, be a particulate filler. Example shapes of the particles include a sphere, an ellipse, a plate shape, a bar shape, and an irregular shape. In order to prevent a short circuit in the battery, the particles are preferably (i) plate-shaped particles or (ii) primary particles that are not aggregated.

The filler can form fine bumps on a surface of the porous layer, thereby improving the slidability. A filler including (i) plate-shaped particles or (ii) primary particles that are not aggregated forms finer bumps on a surface of the porous layer so that the porous layer adheres better to an electrode.

In a case where the laminated body is formed by disposing the porous layer on one or both surfaces of the porous base material serving as a base material, the porous layer has a thickness which is preferably 0.5 μm to 10 μm, more preferably 0.5 μm to 5 μm, still more preferably 1 μm to 5 μm, and particularly preferably 2 μm to 5 μm, on one surface of the porous base material in order to ensure (i) adhesion to an electrode and (ii) a high energy density.

If the porous layer has a thickness of less than 0.5 μm on one surface of the porous base material, it will be impossible to, in a case where a laminated body including such a porous layer is used as a nonaqueous electrolyte secondary battery separator, sufficiently prevent an internal short circuit caused by, for example, breakage of a nonaqueous electrolyte secondary battery. Further, such a porous layer retains a smaller amount of electrolyte.

If the porous layer has a thickness of more than 10 μm on one surface of the porous base material, in a case where the laminated body including such a porous layer is used as a nonaqueous electrolyte secondary battery separator, there will be an increased resistance to permeation of lithium ions across all regions of the separator. Thus, repeating charging and discharging cycles will degrade the cathode of the nonaqueous electrolyte secondary battery, with the result of a degraded discharge rate characteristic and a degraded charge/discharge cycle characteristic (hereinafter also referred to simply as a "cycle characteristic"). Further, such a porous layer will increase the distance between the cathode and the anode, with the result of a larger nonaqueous electrolyte secondary battery.

In a case where the porous layer is disposed on both surfaces of the porous base material, the physical properties of the porous layer that are described below at least refer to the physical properties of the porous layer disposed on a surface of a laminated body, which surface faces the cathode of a nonaqueous electrolyte secondary battery including the laminated body as a nonaqueous electrolyte secondary battery separator, the laminated body including the porous base material and the porous layer.

The porous layer only needs to have a weight per unit area (per one surface thereof) which weight is appropriately determined in view of the strength, film thickness, weight, and handleability of the laminated body. In a case where a laminated body containing such a porous layer is used as a nonaqueous electrolyte secondary battery separator, the porous layer normally has a weight per unit area of preferably 0.5 $g/m^2$ to 20 $g/m^2$, more preferably 0.5 $g/m^2$ to 10 $g/m^2$.

In a case where the porous layer has a weight per unit area which falls within such a numerical range, it is possible to increase the weight energy density and volume energy density of a nonaqueous electrolyte secondary battery including, as a nonaqueous electrolyte secondary battery separator, a laminated body containing the porous layer. If the weight per unit area of the porous layer is beyond the above range, a nonaqueous electrolyte secondary battery including the laminated separator will be heavy.

The porous layer contains a component(s) in a volume per square meter (on one surface) within a range of preferably 0.5 cm³ to 20 cm³, more preferably 1 cm³ to 10 cm³, and further preferably 2 cm³ to 7 cm³. In other words, the porous layer has a component volume per unit area (on one surface) within a range of preferably 0.5 cm³/m² to 20 cm³/m², more preferably 1 cm³/m² to 10 cm³/m², and further preferably 2 cm³/m² to 7 cm³/m². If the porous layer has a component volume per unit area of less than 0.5 cm³/m², it will be impossible to, in a case where a laminated body including such a porous layer is used as a nonaqueous electrolyte secondary battery separator, sufficiently prevent an internal short circuit caused by, for example, breakage of the battery. If the porous layer has a component volume per unit area of more than 20 cm³/m², and a laminated body including the porous layer is used as a nonaqueous electrolyte secondary battery separator, the separator will have an increased resistance to permeation of lithium ions across all regions of the separator. Thus, repeating charging and discharging cycles will degrade the cathode, with the result of a degraded discharge rate characteristic and a degraded cycle characteristic.

The component volume per unit area of the porous layer is calculated by the following method:

(1) The weight per unit area of each component of the porous layer is calculated by multiplying the weight per unit area of the porous layer by the weight concentration of the component (that is, the weight concentration in the porous layer).

(2) The weight per unit area of each component calculated in (1) is divided by the absolute specific gravity of the component. Then, the sum total of numerical values calculated is designated as the component volume per unit area of the porous layer.

The porous layer has a porosity that is preferably 20% by volume to 90% by volume, and more preferably 30% by volume to 80% by volume, in order to achieve sufficient ion permeability. The pore diameter of the pores in the porous layer is preferably not more than 1 μm, and more preferably not more than 0.5 μm. Pores having such a pore diameter make it possible to achieve sufficient ion permeability in a nonaqueous electrolyte secondary battery that includes, as a nonaqueous electrolyte secondary battery separator, a laminated body including the porous layer.

The porous layer used in an embodiment of the present invention has a surface roughness, in terms of a ten-point average roughness (Rz), that is preferably 0.8 μm to 8.0 μm, more preferably 0.9 μm to 6.0 μm, and further preferably 1.0 μm to 3.0 μm. The ten-point average roughness (Rz) is a value measured by a method in conformity with JIS B 0601-1994 (or Rzjis of JIS B 0601-2001). Specifically, Rz is a value measured with use of ET4000 (available from Kosaka Laboratory Ltd.) with a measurement length of 1.25 mm, a measurement rate of 0.1 mm/sec, and a temperature and humidity of 25° C./50% RH.

The porous layer used in an embodiment of the present invention has a coefficient of kinetic friction that is preferably 0.1 to 0.6, more preferably 0.1 to 0.4, and still more preferably 0.1 to 0.3. The coefficient of kinetic friction is a value measured by a method in conformity with JIS K 7125. Specifically, a coefficient of kinetic friction used in an embodiment of the present invention is a value measured by Surface Property Tester (manufactured by Heidon).

(1-5) Crystal Forms of PVDF-Based Resin

The PVDF-based resin in the porous layer for use in an embodiment of the present invention contains crystal form α in an amount of not less than 34 mol %, preferably not less than 39 mol %, more preferably not less than 60 mol %, and further preferably not less than 70 mol %, with respect to 100 mol % of the total amount of crystal form α and crystal form β contained in the PVDF-based resin. Further, the amount of crystal form α is preferably not more than 95 mol %. Containing crystal form α in an amount of not less than 34 mol % allows a laminated body including the porous layer to have a superior cycle characteristic and be used as a member of a nonaqueous electrolyte secondary battery, such as a nonaqueous electrolyte secondary battery separator, in which curling is prevented.

A laminated body in accordance with an embodiment of the present invention can prevent itself from curling presumably because, for example, (i) a smaller content of the PVDF-based resin having crystal form β, which PVDF-based resin strongly adheres to the porous base material, allows the porous layer to be deformed to only a moderately smaller degree in response to deformation of the porous base material and/or (ii) a larger content of the PVDF-based resin having crystal form α, which PVDF-based resin is high in rigidity, allows the porous layer to be more resistant to deformation.

The PVDF-based resin having crystal form α is arranged such that the polymer of the PVDF-based resin contains the following PVDF skeleton. That is, the PVDF skeleton has a TGT$\overline{\text{G}}$-type conformation in which there are two or more consecutive chains of a conformation such that, with respect to a fluorine atom (or a hydrogen atom) bonded to a carbon atom present in a main chain of a molecular chain of the skeleton, a hydrogen atom (or a fluorine atom) bonded to a neighboring carbon atom has a trans position, and a hydrogen atom (or a fluorine atom) bonded to another (opposite) neighboring carbon atom has a gauche position (positioned at an angle of 60°). The molecular chain is of TGT$\overline{\text{G}}$ type and the dipole moments of C—$F_2$ and C—$H_2$ bonds have respective components oriented perpendicularly and horizontally to the molecular chain.

The PVDF-based resin having crystal form α has characteristic peaks (characteristic absorptions) at around 1,212 $cm^{-1}$, around 1,183 $cm^{-1}$, and around 765 $cm^{-1}$ in its IR spectrum. The PVDF-based resin having crystal form α has characteristic peaks at around 2θ=17.7°, around 2θ=18.3°, and around 2θ=19.9° in a powder X-ray diffraction analysis.

The PVDF-based resin having crystal form β is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The PVDF-based resin having crystal form β may be arranged such that the polymer of the PVDF-based resin contains a PVDF skeleton that has a TT-type conformation in its entirety. The PVDF-based resin having crystal form β may alternatively be arranged such that a portion of the PVDF skeleton has a TT-type conformation and that the PVDF-based resin having crystal form β has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii) the respective dipole moments of C—$F_2$ and C—$H_2$ bonds each have a component perpendicular to the molecular chain.

The PVDF-based resin having crystal form β has characteristic peaks (characteristic absorptions) at around 1,274 $cm^{-1}$, around 1,163 $cm^{-1}$, and around 840 $cm^{-1}$ in its IR spectrum. The PVDF-based resin having crystal form β has a characteristic peak at around 2θ=21° in a powder X-ray diffraction analysis.

A PVDF-based resin having crystal form γ is arranged such that the polymer of the PVDF-based resin contains a PVDF skeleton that has a conformation in which TT-type conformations and TG-type conformations appear consecutively and alternately. The PVDF-based resin having crystal form γ has characteristic peaks (characteristic absorptions) at around 1,235 cm$^{-1}$ and around 811 cm$^{-1}$ in its IR spectrum. The PVDF-based resin having crystal form γ has a characteristic peak at around 2θ=18° in a powder X-ray diffraction analysis.

(1-6) Method for Calculating Content Rates of Crystal Form a and Crystal Form β in PVDF-Based Resin The respective content rates of crystal form α and crystal form β in the PVDF-based resin can be calculated by, for example, the methods (i) to (iii) below.

(i) Calculation formula $$\text{Law of Beer: } A = \varepsilon b C \quad (1)$$

where A represents an absorbance, ε represents a molar extinction coefficient, b represents an optical path length, and C represents a concentration.

Assuming that on the basis of the above formula (1), $A^\alpha$ represents the absorbance of the characteristic absorption of crystal form α, $A^\beta$ represents the absorbance of the characteristic absorption of crystal form β, $\varepsilon^\alpha$ represents the molar extinction coefficient of the PVDF-based resin having crystal form α, $\varepsilon^\beta$ represents the molar extinction coefficient of the PVDF-based resin having crystal form β, $C^\alpha$ represents the concentration of the PVDF-based resin having crystal form α, and $C^\beta$ represents the concentration of the PVDF-based resin having crystal form β, the respective proportions of the respective absorbances of crystal form α and crystal form β are expressed as follows:

$$A^\beta / A^\alpha = (\varepsilon^\beta / \varepsilon^\alpha) \times (C^\beta / C^\alpha) \quad (1a)$$

Assuming that a correction factor $(\varepsilon^\beta/\varepsilon^\alpha)$ for the molar extinction coefficient is $E^{\beta/\alpha}$, the content rate $F(\beta)=(C^\beta/(C^\alpha+C^\beta))$ of the PVDF-based resin having crystal form β with respect to the crystal form α and crystal form β combined is expressed by the following formula (2a):

$$F(\beta) = \{(1/E^{\beta/\alpha}) \times (A^\alpha/A^\beta)\}/\{1+(1/E^{\beta/\alpha}) \times (A^\alpha/A^\beta)\} = A^\beta/\{(E^{\beta/\alpha} \times A^\alpha)+A^\beta\} \quad (2a)$$

Thus, in a case where the correction factor $E^{\beta/\alpha}$ is determined, the content rate F(β) of the PVDF-based resin having crystal form β with respect to the crystal form α and crystal form β combined can be calculated from an actual measurement of the absorbance $A^\alpha$ of the characteristic absorption of crystal form α and an actual measurement of the absorbance $A^\beta$ of the characteristic absorption of crystal form β. Further, the content rate F(α) of the PVDF-based resin having crystal form α with respect to the crystal form α and crystal form β combined can be calculated from F(β) calculated as above.

(ii) Method for Determining Correction Factor Eβ/α

A sample of a PVDF-based resin having only crystal form α is mixed with a sample of a PVDF-based resin having only crystal form β for preparation of a sample with a known content rate F(β) of the PVDF-based resin having crystal form β. The IR spectrum of the prepared sample is measured. Then, measurements are made of the absorbance (peak height) $A^\alpha$ of the characteristic absorption of crystal form α and the absorbance (peak height) $A^\beta$ of the characteristic absorption of crystal form β in the IR spectrum measured above.

Subsequently, $A^\alpha$ and $A^\beta$ are substituted into the formula (3a) below, into which the formula (2a) is solved for $E^{\beta/\alpha}$, to determine a correction factor $E^{\beta/\alpha}$.

$$E^{\beta/\alpha} = \{A^\beta \times (1-F(\beta))\}/(A^\alpha \times F(\beta)) \quad (3a)$$

Measurements are made of respective IR spectra of a plurality of samples having respective mixing ratios different from each other. The respective correction factors $E^{\beta/\alpha}$ of the plurality of samples are determined by the above method, and the average of the correction factors $E^{\beta/\alpha}$ is then calculated.

(iii) Calculation of respective content rates of crystal form α and crystal form β in sample For each sample, the content rate F(a) of the PVDF-based resin having crystal form α with respect to the crystal form α and crystal form β combined is calculated on the basis of the average correction factor $E^{\beta/\alpha}$ calculated in (ii) above and the result of measurement of the IR spectrum of the sample.

Specifically, the content rate F(α) is calculated as follows: A laminated body including the above porous layer is prepared by a preparation method described later. A portion of the laminated body is cut out for preparation of a measurement sample. Then, the infrared absorption spectrum of the measurement sample at wave numbers from 4000 cm$^{-1}$ to 400 cm$^{-1}$ (measurement range) is measured at room temperature (approximately 25° C.) with use of an FT-IR spectrometer (available from Bruker Optics K.K.; model: ALPHA Platinum-ATR) with a resolution of 4 cm$^{-1}$ and 512 times of scanning. The measurement sample cut out is preferably in the shape of an 80 mm×80 mm square. The size and shape of the measurement sample are, however, not limited to that; the measurement sample simply needs to be so sized as to allow its infrared absorption spectrum to be measured. Then, from the spectrum measured, the absorption intensity ($A^\alpha$) at 765 cm$^{-1}$ (characteristic absorption of crystal form α) and the absorption intensity ($A^\beta$) at 840 cm$^{-1}$ (characteristic absorption of crystal form β) are determined. The starting point and end point of a waveform formed with the wave number set as a peak are connected with a straight line, where the length between the straight line and the peak wave number (peak top) denote an absorption intensity. For crystal form a, a maximum possible absorption intensity within the wave number range of 775 cm$^{-1}$ to 745 cm$^{-1}$ is assumed to be the absorption intensity ($A^\alpha$) at 765 cm$^{-1}$. For crystal form β, a maximum possible absorption intensity within the wave number range of 850 cm$^{-1}$ to 815 cm$^{-1}$ is assumed to be the absorption intensity ($A^\beta$) at 840 cm$^{-1}$. Note that the content rate F(α) of crystal form α herein is calculated on the assumption of the average correction factor $E^{\beta/\alpha}$ being 1.681 (with reference to Japanese Patent Application Publication, Tokukai, No. 2005-200623). The calculation uses the following formula (4a):

$$F(\alpha)(\%) = [1-\{\text{absorption intensity } (A^\beta) \text{ at } 840 \text{ cm}^{-1}/(\text{absorption intensity } (A^\alpha) \text{ at } 765 \text{ cm}^{-1} \times \text{correction factor } (E^{\beta/\alpha}) (1.681) + \text{absorption intensity } (A^\beta) \text{ at } 840 \text{ cm}^{-1})\}] \times 100 \quad (4a)$$

(1-7) Method for Producing Porous Layer

The porous layer used in an embodiment of the present invention can be produced by, for example, a method similar to a below-described method for producing a laminated body and nonaqueous electrolyte secondary battery separator constituted by the laminated body in accordance with an embodiment of the present invention.

(1-8) Laminated Body

The laminated body in accordance with an embodiment of the present invention includes the above-described porous base material and the above-described porous layer disposed on one surface or both surfaces of the porous base material.

In a case where the porous layer is disposed on one surface of a separator which is used as a member of the nonaqueous electrolyte secondary battery, the porous layer is preferably disposed on a surface of the separator which surface is opposite from a cathode of the nonaqueous electrolyte secondary battery, more preferably disposed on a surface of the separator which surface comes into contact with the cathode.

The laminated body in accordance with an embodiment of the present invention has a thickness that is preferably 5.5 µm to 45 µm, and more preferably 6 µm to 25 µm.

The laminated body has an air permeability of preferably 30 sec/100 cc to 1000 sec/100 cc, more preferably 50 sec/100 cc to 800 sec/100 cc in terms of Gurley values. A laminated body having such an air permeability achieves sufficient ion permeability in a case where the laminated body is used as a nonaqueous electrolyte secondary battery separator. An air permeability larger than the above range means that the laminated body has a high porosity and thus has a coarse laminated structure. This may result in the laminated body having a lower strength and thus having an insufficient shape stability at high temperatures in particular. An air permeability smaller than the above range may, on the other hand, prevent the laminated body from having sufficient ion permeability when used as a nonaqueous electrolyte secondary battery separator and thus degrade the battery characteristics of the nonaqueous electrolyte secondary battery which includes a nonaqueous electrolyte secondary battery separator constituted by the laminated body.

(1-9) Method for Producing Porous Layer

A method for producing (i) a porous layer used in an embodiment of the present invention and (ii) a laminated body in accordance with an embodiment of the present invention is not particularly limited, and any of a variety of methods may be used.

In an example method, a porous layer containing a PVDF-based resin and optionally a filler is formed, through one of the processes (1) to (3) below, on a surface of a polyolefin-based resin microporous film to be a porous base material. The processes (2) and (3) each further involve drying a deposited porous layer to remove a solvent. In the processes (1) to (3), the coating solution, in the case of production of a porous layer containing a filler, preferably contains a filler dispersed therein and a PVDF-based resin dissolved therein.

The coating solution for use in a method for producing a porous layer used in an embodiment of the present invention can be prepared normally by (i) dissolving, in a solvent, a resin to be contained in the porous layer used in an embodiment of the present invention and (ii) dispersing, in the solvent, fine particles to be contained in the porous layer used in an embodiment of the present invention.

(1) A process of (i) coating a surface of a porous base material with a coating solution containing fine particles of a PVDF-based resin to be contained in the porous layer and optionally fine particles of a filler and (ii) drying the surface of the porous base material to remove the solvent (dispersion medium) from the coating solution for formation of a porous layer.

(2) A process of (i) coating a surface of the porous base material with a coating solution containing fine particles of a PVDF-based resin to be contained in the porous layer and optionally fine particles of a filler and then (ii) immersing the porous base material into a deposition solvent (which is a poor solvent for the PVDF-based resin) for deposition of a porous layer containing the PVDF-based resin and optionally the filler.

(3) A process of (i) coating a surface of the porous base material with a coating solution containing fine particles of a PVDF-based resin to be contained in the porous layer and optionally fine particles of a filler and then (ii) making the coating solution acidic with use of a low-boiling-point organic acid for deposition of a porous layer containing the PVDF-based resin and optionally the filler.

The solvent (dispersion medium) in the coating solution may be any solvent that does not adversely affect the porous base material, that allows a PVDF-based resin to be dissolved or dispersed therein uniformly and stably, and that allows a filler to be dispersed therein uniformly and stably. Examples of the solvent (dispersion medium) include N-methylpyrrolidone, N,N-dimethylacetamide, N,N-dimethylformamide, acetone, and water. The present embodiment may use only one kind of solvent (dispersion medium) or two or more kinds of solvents in combination.

The deposition solvent can be, for example, another solvent (hereinafter also referred to as "solvent X") that is dissolvable in the solvent (dispersion medium) contained in the coating solution and that does not dissolve the PVDF-based resin contained in the coating solution. The solvent (dispersion medium) can be efficiently removed from the coating solution by (i) immersing, in the solvent X, a porous base material to which the coating solution has been applied and on which a coating film has been formed, for replacement of the solvent (dispersion medium) in the coating film on the porous base material or a support with the solvent X and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

The coating solution may be prepared by any method that allows the coating solution to satisfy conditions such as the resin solid content (resin concentration) and the filler amount that are necessary to produce a desired porous layer. Specific examples of the method for preparing a coating solution include a mechanical stirring method, an ultrasonic dispersion method, a high-pressure dispersion method, and a media dispersion method. The filler may be dispersed in the solvent (dispersion medium) with use of a conventionally publicly known dispersing device such as a three-one motor, a homogenizer, a media-type dispersing device, or a pressure-type dispersing device. Further, the coating solution may be prepared simultaneously with wet grinding of fine particles by supplying into a wet grinding device a liquid in which a resin is dissolved or swollen or an emulsified liquid of a resin during wet grinding carried out to produce fine particles having a desired average particle diameter. In other words, the wet grinding of fine particles and the preparation of a coating solution may be carried out simultaneously in a single step.

The coating solution may contain an additive(s) such as a dispersing agent, a plasticizing agent, a surfactant, and a pH adjusting agent as a component(s) other than the resin and the fine particles as long as such an additive does not prevent an object of the present invention from being attained. The additive may be added in an amount that does not prevent an object of the present invention from being attained.

The coating solution may be applied to the porous base material by any method, that is, a porous layer may be formed by any method on a surface of a porous base material that may have been subjected to a hydrophilization treatment as necessary. In a case where a porous layer is disposed on each of both surfaces of the porous base material, (i) a sequential deposition method may be used, in which a porous layer is formed on one surface of the porous base material, and another porous layer is subsequently formed on the other surface of the porous base material, or (ii) a simultaneous deposition method may be used, in which porous layers are formed simultaneously on both surfaces of the porous base material.

A porous layer can be formed (that is, a laminated body can be produced) by, for example, (i) a method of applying the coating solution directly to a surface of the porous base material and then removing the solvent (dispersion medium), (ii) a method of applying the coating solution to an appropriate support, removing the solvent (dispersion medium) for formation of a porous layer, then pressure-bonding the porous layer to the porous base material, and peeling the support off, (iii) a method of applying the coating solution to a surface of an appropriate support, then pressure-bonding the porous base material to that surface, then peeling the support off, and then removing the solvent (dispersion medium), or (iv) a method of immersing the porous base material into the coating solution for dip coating and then removing the solvent (dispersion medium).

The thickness of the porous layer may be controlled by adjusting, for example, (i) the thickness of a coating film in a wet state after the coating, (ii) the weight ratio of the resin and the filler, and/or (iii) the solid content concentration of the coating solution (that is, the sum of the resin concentration and the filler concentration). The support can be, for example, a resin film, a metal belt, or a drum.

The coating solution may be applied to the porous base material or support by any method that can achieve a necessary weight per unit area and a necessary coating area. The coating solution can be applied by a conventionally publicly known method. Specific examples include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, and a spray coating method.

The solvent (dispersion medium) is typically removed by a drying method. Examples of the drying method include natural drying, air-blow drying, heat drying, and drying under reduced pressure. The solvent (dispersion medium) can, however, be removed by any method that allows the solvent (dispersion medium) to be removed sufficiently.

The solvent (dispersion medium) contained in the coating solution may be replaced with another solvent before a drying operation. The solvent (dispersion medium) can be replaced with another solvent for removal by, for example, a method of (i) preparing another solvent (hereinafter referred to as "solvent X") that dissolves in the solvent (dispersion medium) contained in the coating solution and that does not dissolve the resin contained in the coating solution, (ii) immersing the porous base material or support, to which the coating solution has been applied and on which a coating film has been formed, into the solvent X to replace the solvent (disperse medium) in the coating film on the porous base material or support with the solvent X, and (iii) evaporating the solvent X. This method allows the solvent (dispersion medium) to be removed efficiently from the coating solution.

In a case where the coating film, formed on the porous base material or support by applying the coating solution thereto, is heated when removing the solvent (dispersion medium) or solvent X from the coating film, the coating film is desirably heated at a temperature that does not decrease the air permeability of the porous base material, specifically within a range of 10° C. to 120° C., preferably within a range of 20° C. to 80° C., to prevent pores in the porous base material from contracting to decrease the air permeability of the porous base material.

The solvent (dispersion medium) is preferably removed by, in particular, a method of applying the coating solution to a base material and then drying the base material for formation of a porous layer. This arrangement makes it possible to produce a porous layer having a smaller porosity variation and fewer wrinkles.

The above drying can be carried out with the use of a normal drying device.

The porous layer normally has, on one surface of the porous base material, an applied amount (weight per unit area) within a range of preferably 0.5 g/m$^2$ to 20 g/m$^2$, more preferably 0.5 g/m$^2$ to 10 g/m$^2$, further preferably 0.5 g/m$^2$ to 1.5 g/m$^2$, in terms of the solid content in view of adhesiveness to an electrode and ion permeability. This means that the amount of the coating solution to be applied to the porous base material is preferably adjusted so that the porous layer in a laminated body or nonaqueous electrolyte secondary battery separator to be produced has an applied amount (weight per unit area) within the above range.

In a case where an additional layer such as a heat-resistant layer is to be disposed on the laminated body, such a heat-resistant layer can be disposed by a method similar to the above method except that the resin constituting the porous layer is replaced with a resin for the heat-resistant layer.

The present embodiment is arranged such that in any of the processes (1) to (3), changing the amount of resin constituting a porous layer which resin is to be dissolved or dispersed in a solution can adjust the volume of resin that is contained per square meter of a porous layer having undergone immersion in an electrolyte and that has absorbed the electrolyte.

Further, changing the amount of solvent in which the resin constituting the porous layer is to be dissolved or dispersed can adjust the porosity and average pore diameter of a porous layer having undergone immersion in an electrolyte.

(1-10) Method for Controlling Crystal Forms of PVDF-Based Resin

A laminated body in accordance with an embodiment of the present invention is produced while adjustment is made of the drying conditions (for example, the drying temperature, and the air velocity and direction during drying) and/or the deposition temperature (that is, the temperature at which a porous layer containing a PVDF-based resin is deposited with use of a deposition solvent or a low-boiling-point organic acid) for the above-described method to control the crystal forms of the PVDF-based resin to be contained in a porous layer to be formed. Specifically, a laminated body in accordance with an embodiment of the present invention can be produced while the drying conditions and the deposition temperature are adjusted so that the PVDF-based resin contains crystal form α in an amount of not less than 34 mol % (preferably not less than 39 mol %, more preferably not less than 60 mol %, further preferably not less than 70 mol %; preferably not more than 95 mol %) with respect to 100 mol % of the total amount of the crystal form α and crystal form β contained in the PVDF-based resin.

The drying conditions and the deposition temperature, which are adjusted so that the PVDF-based resin contains crystal form α in an amount of not less than 34 mol % with respect to 100 mol % of the total amount of the crystal form a and crystal form β contained, may be changed as appropriate by changing, for example, the method for producing a porous layer, the kind of solvent (dispersion medium) to be used, the kind of deposition solvent to be used, and/or the kind of low-boiling-point organic acid to be used.

In a case where a deposition solvent is not used and the coating solution is simply dried as in the process (1), the drying conditions may be changed as appropriate by adjusting, for example, the concentration of the solvent in the coating solution, the concentration of the PVDF-based resin in the coating solution, the amount of the filler (if contained), and/or the amount of the coating solution to be applied. In a case where a porous layer is to be formed through the process (1) described above, it is preferable that the drying temperature be 30° C. to 100° C., that the direction of hot air for drying be perpendicular to a porous base material or electrode sheet to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a porous base material or electrode sheet to which the coating solution has been applied, and that the velocity of the hot air is 0.4 m/s to 40 m/s.

In a case where a porous layer is to be formed through the process (2) described above, it is preferable that the deposition temperature be −25° C. to 60° C. and that the drying temperature be 20° C. to 100° C. Specifically, in a case where a porous layer is to be formed through the above-described process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

[2. Nonaqueous Electrolyte Secondary Battery Member and Nonaqueous Electrolyte Secondary Battery]

A nonaqueous electrolyte secondary battery in accordance with an embodiment of the present invention includes the above laminated body as a separator. More specifically, a nonaqueous electrolyte secondary battery in accordance with an embodiment of the present invention includes a nonaqueous electrolyte secondary battery member which includes a cathode, the above laminated body, and an anode that are arranged in this order. The nonaqueous electrolyte secondary battery member is also encompassed in the scope of the present invention. The description below deals with a lithium-ion secondary battery as an example of the nonaqueous electrolyte secondary battery. The components of the nonaqueous electrolyte secondary battery other than a separator are not limited to those described below.

(2-1) Nonaqueous Electrolyte

A nonaqueous electrolyte secondary battery in accordance with an embodiment of the present invention can include a nonaqueous electrolyte containing, for example, an organic solvent and a lithium salt dissolved therein. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use only one kind of the above lithium salts or two or more kinds of the above lithium salts in combination.

It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents prepared by introducing a fluorine group into the organic solvents described above. The present embodiment may use only one kind of the above organic solvents or two or more kinds of the above organic solvents in combination.

Among the above organic solvents, carbonates are preferable. A mixed solvent of a cyclic carbonate and an acyclic carbonate or a mixed solvent of a cyclic carbonate and one of ethers is further preferable.

The mixed solvent of a cyclic carbonate and an acyclic carbonate is further preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite and/or artificial graphite.

(2-2) Cathode

The cathode is normally a sheet-shaped cathode including (i) a cathode mix containing a cathode active material, an electrically conductive material, and a binder and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni.

Among such lithium complex oxides, (i) a lithium complex oxide having an $\alpha$-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is further preferably complex lithium nickelate.

Further, it is particularly preferable to use a complex lithium nickelate containing at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among others, an active material that contains Al or Mn and that contains Ni at a proportion of not less than 85%, further preferably not less than 90%, is particularly preferable because a nonaqueous electrolyte secondary battery including a cathode containing the above active material has an excellent cycle characteristic for use as a high-capacity battery.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example a mixture of artificial graphite and carbon black.

Examples of the binder include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binder functions also as a thickening agent.

The cathode mix may be prepared by, for example, a method of applying pressure to the cathode active material, the electrically conductive material, and the binder on the cathode current collector or a method of using an appropriate organic solvent so that the cathode active material, the electrically conductive material, and the binder are in a paste form.

Examples of the cathode current collector include electric conductors such as Al, Ni, and stainless steel. Among these, Al is preferable as it is easy to process into a thin film and less expensive.

The sheet-shaped cathode may be produced, that is, the cathode mix may be supported by the cathode current collector, through, for example, a method of applying pressure to the cathode active material, the electrically conductive material, and the binder on the cathode current collector to form a cathode mix thereon or a method of (i) using an appropriate organic solvent so that the cathode active material, the electrically conductive material, and the binder are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

(2-3) Anode

The anode is normally a sheet-shaped anode including (i) an anode mix containing an anode active material and (ii) an anode current collector supporting the anode mix thereon. The sheet-shaped anode preferably contains the above electrically conductive material and binder.

The anode active material is, for example, (i) a material capable of being doped and dedoped with lithium ions, (ii) a lithium metal, or (iii) a lithium alloy. Specific examples of the material include (i) carbonaceous materials such as natural graphite, artificial graphite, cokes, carbon black, pyrolytic carbons, carbon fiber, and a fired product of an organic polymer compound; (ii) chalcogen compounds such as an oxide and a sulfide that are doped and dedoped with lithium ions at an electric potential lower than that for the cathode; (iii) metals such as aluminum (Al), lead (Pb), tin (Sn), bismuth (Bi), or silicon (Si), each of which is alloyed with alkali metal; (iv) an intermetallic compound (AlSb, $Mg_2Si$, $NiSi_2$) of a cubic system in which intermetallic compound alkali metal can be inserted in voids in a lattice; and (v) a lithium nitrogen compound ($Li_3$-$xM_xN$ (where M represents a transition metal)). Among the above anode active materials, a carbonaceous material containing a graphite material such as natural graphite or artificial graphite as a main component is preferable, an anode active material which is a mixture of graphite and silicon and in which the ratio of Si to C is not less than 5% is more preferable, and an anode active material in which the ratio of Si to C is not less than 10% is further preferable. This is because such a carbonaceous material has high electric potential flatness and low average discharge potential and can thus be combined with a cathode to achieve high energy density.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel. Among these, Cu is preferable as it is not easily alloyed with lithium in the case of a lithium-ion secondary battery in particular and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The above paste preferably includes the above electrically conductive material and binder.

(2-4) Method for Producing Nonaqueous Electrolyte Secondary Battery Member and Nonaqueous Electrolyte Secondary Battery A nonaqueous electrolyte secondary battery member in accordance with an embodiment of the present invention can be produced by, for example, a method of arranging the cathode, the above-described laminated body, and the anode in this order. A nonaqueous electrolyte secondary battery in accordance with an embodiment of the present invention can be produced by, for example, (i) producing a nonaqueous electrolyte secondary battery member as described above, (ii) inserting the nonaqueous electrolyte secondary battery member into a container that is for use as a housing of a nonaqueous electrolyte secondary battery, (iii) filling the container with a nonaqueous electrolyte, and (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery member and the nonaqueous electrolyte secondary battery may each be produced through any method, and may each be produced through a conventionally publicly known method.

A nonaqueous electrolyte secondary battery member in accordance with an embodiment of the present invention and a nonaqueous electrolyte secondary battery in accordance with an embodiment of the present invention each include the above-described porous layer, which contains a polyvinylidene fluoride-based resin (PVDF-based resin), the PVDF-based resin containing crystal form α in an amount of not less than 34 mol % with respect to 100 mol % of the total amount of the crystal form α and crystal form β contained in the PVDF-based resin. As a result, curling is prevented in the nonaqueous electrolyte secondary battery member in accordance with an embodiment of the present invention and the nonaqueous electrolyte secondary battery in accordance with an embodiment of the present invention.

A nonaqueous electrolyte secondary battery member and a nonaqueous electrolyte secondary battery in accordance with an embodiment of the present invention each include a laminated body including a porous base material, the porous base material having (i) a phase difference of not more than 80 nm with respect to light with a wavelength of 590 nm in a state where the porous base material is impregnated with ethanol and (ii) a porosity within a range of 30% to 60%. This makes it possible to achieve an excellent internal resistance of a nonaqueous electrolyte secondary battery immediately after the battery is assembled.

EXAMPLES

<Method of Measuring Various Physical Properties>

Various physical properties of nonaqueous electrolyte secondary battery separators in accordance with Production Examples 1 to 4 and Comparative Examples 1 to 3 were measured by the method below.

(1) Porosity

A square piece measuring 8 cm per side was cut out from the porous base material which is used as a nonaqueous electrolyte secondary battery separator. The weight W (g) and thickness E (cm) of the piece cut out were then measured. The porosity of the porous base material was calculated, on the basis of (i) the weight (W) and thickness (E) measured above and (ii) the true specific gravity p (g/cm$^3$) of the porous base material, by the following Formula:

Porosity=(1−{(W/ρ)}/(8×8×E))×100.

(2) Phase Difference and Birefringent Index

A translucent base material was obtained by (i) cutting out a square piece measuring 4 cm per side from the porous base material which is used as a nonaqueous electrolyte secondary battery separator and (ii) dropping 0.5 mL of ethanol on the square piece of the porous base material so that the square piece is impregnated with ethanol. In doing so, excess ethanol which was not absorbed by the square piece was wiped off and removed. Then, a birefringent index at 25° C., with respect to light having a wavelength of 590 nm, of the translucent base material thus obtained was measured by use of a phase difference measuring device (KOBRA-WPR) manufactured by Oji Scientific Instruments, and a phase difference was calculated.

(3) Electric Resistance

By use of an LCR meter (product name: chemical impedance meter (model: 3532-80)) manufactured by HIOKI E.E. CORPORATION, a voltage having an amplitude of 10 mV was applied at 25° C. to a nonaqueous electrolyte secondary battery that was assembled as described later, and an alternating current impedance was measured. A resistance value R of a real part of a measured frequency of 10 Hz was assumed to be a resistance value (i.e., an internal resistance value of the nonaqueous electrolyte secondary battery) obtained immediately after the nonaqueous electrolyte secondary battery was assembled.

<Production of Nonaqueous Electrolyte Secondary Battery Separator>

The porous base materials in accordance with Production Examples 1 through 4, which are used as nonaqueous secondary battery separators, were produced as described below.

Production Example 1

First, 68% by weight of ultra-high molecular weight polyethylene powder (GUR2024, available from Ticona Corporation) and 32% by weight of polyethylene wax (FNP-O115; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 38% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of reduction rolls each having a surface temperature of 150° C., and was gradually cooled while being pulled with use of a winding roll rotating at a rate different from that of the pair of reduction rolls. In this example, a sheet having a thickness of approximately 62 μm was produced at a roll-draw rate (winding roll speed/reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 6.2 times at 105° C., and thus a porous base material of Production Example 1 was obtained.

Production Example 2

First, 68.5% by weight of ultra-high molecular weight polyethylene powder (GUR4032, available from Ticona Corporation) and 31.5% by weight of polyethylene wax (FNP-O115; degree of branching: 1/1000C; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium C Ltd.) having an average pore diameter of 0.1 μm was further added by 36% by volume with respect to the total volume of the above ingredients. Then, the ingredients were mixed in powder form with use of a Henschel mixer, and were then melted and kneaded with use of a twin screw kneading extruder. This produced a polyolefin resin composition.

Then, the polyolefin resin composition was rolled with use of a pair of reduction rolls each having a surface temperature of 150° C., and was gradually cooled while being pulled with use of a winding roll rotating at a rate different from that of the pair of reduction rolls. In this example, a sheet having a thickness of approximately 62 μm was produced at a roll-draw rate (winding roll speed/reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 7 times at 105° C., and thus a porous base material of Production Example 2 was obtained.

Production Example 3

First, 80% by weight of ultra-high molecular weight polyethylene powder (GUR4012, available from Ticona Corporation) and 20% by weight of polyethylene wax (FNP-O115; degree of branching: 1/1000C; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium C Ltd.) having an average pore diameter of 0.1 μm was further added by 37% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of reduction rolls each having a surface temperature of 150° C., and was gradually cooled while being pulled with use of a winding roll rotating at a rate different from that of the pair of reduction rolls. In this example, a sheet having a thickness of approximately 62 μm was produced at a roll-draw rate (winding roll speed/reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 4 times at 105° C., and thus a porous base material of Production Example 3 was obtained.

Production Example 4

First, 80% by weight of ultra-high molecular weight polyethylene powder (GUR4012, available from Ticona Corporation) and 20% by weight of polyethylene wax (FNP-O115; degree of branching: 1/1000C; available from Nippon Seiro Co., Ltd.) having a weight-average molecular weight of 1000 were prepared, that is, 100 parts by weight in total of the ultra-high molecular weight polyethylene and the polyethylene wax were prepared. Then, 0.4% by weight of an antioxidant (Irg1010, available from Ciba Specialty Chemicals), 0.1% by weight of an antioxidant (P168, available from Ciba Specialty Chemicals), and 1.3% by weight of sodium stearate were added to the ultra-high molecular weight polyethylene and the polyethylene wax, and then calcium carbonate (available from Maruo Calcium Co., Ltd.) having an average pore diameter of 0.1 μm was further added by 37% by volume with respect to the total volume of the above ingredients. Then, the ingredients were mixed in powder form with use of a Henschel mixer, and were then melted and kneaded with use of a twin screw kneading extruder. This produced a polyolefin resin composition. Then, the polyolefin resin composition was rolled with use of a pair of reduction rolls each having a surface temperature of 150° C., and was gradually cooled while being pulled with use of a winding roll rotating at a rate different from that of the pair of reduction rolls. In this example, a sheet having a thickness of approximately 62 μm was produced at a roll-draw rate (winding roll speed/reduction roll speed) of 1.4 times. The sheet thus produced was immersed in a hydrochloric acid aqueous solution (4 mol/L of hydrochloric acid, 0.5% by weight of a nonionic surfactant), so that calcium carbonate was removed. Then, the sheet was stretched at a stretch ratio of 5.8 times at 105° C., and thus a porous base material of Production Example 4 was obtained.

Comparative Example 1

A commercially available polyolefin porous base material (polyolefin separator) was used as Comparative Example 1.

Comparative Example 2

Another commercially available polyolefin porous base material (polyolefin separator) which differed from that of Comparative Example 1 was used as Comparative Example 2.

Comparative Example 3

Another commercially available polyolefin porous base material (polyolefin separator) which differed from those of Comparative Examples 1 and 2 was used as Comparative Example 3.

<Production of Nonaqueous Electrolyte Secondary Battery>

Next, using the nonaqueous secondary battery separators which were made of the respective porous base materials in accordance with Production Examples 1 to 4 and Comparative Examples 1 to 3 which were produced as above, nonaqueous secondary batteries were produced as follows.

(Cathode)

A commercially available cathode was used that was produced by applying $LiNi_{0.5}Mn_{0.3}Co0.2O_2$/electrically conductive material PVDF (weight ratio 92:5:3) to an aluminum foil. The aluminum foil was partially cut off so that a cathode active material layer was formed in an area of 40 mm×35 mm and that that area was surrounded by an area with a width of 13 mm in which area no cathode active material layer was formed. The cutoff was used as a cathode. The cathode active material layer had a thickness of 58 μm and a density of 2.50 g/cm$^3$.

(Anode)

A commercially available anode was used that was produced by applying graphite/styrene-1,3-butadiene copolymer/sodium carboxymethylcellulose (weight ratio 98:1:1) to a copper foil. The copper foil was partially cut off so that an anode active material layer was formed in an area of 50 mm×40 mm and that area was surrounded by an area with a width of 13 mm in which area no anode active material layer was formed. The cutoff was used as an anode. The anode active material layer had a thickness of 49 μm and a density of 1.40 g/cm$^3$.

(Assembly)

Nonaqueous electrolyte secondary battery members were produced by laminating (arranging), in a laminate pouch, (i) the cathode, (ii) a respective one of the porous base materials of Production Examples 1 to 4 and Comparative Examples 1 to 3 (respective one of the electrolyte secondary battery separators constituted by these porous base materials), and (iii) the anode, such that the cathode, the porous base material, and the anode were laminated in this order. In so doing, the cathode and the anode were arranged so that a whole of a main surface of the cathode active material layer of the cathode was included in a range of a main surface (overlapped the main surface) of the anode active material layer of the anode.

Subsequently, each nonaqueous electrolyte secondary battery member was put into a bag made of a laminate of an aluminum layer and a heat seal layer. Further, 0.25 mL of nonaqueous electrolyte was put into the bag. The nonaqueous electrolyte was an electrolyte at 25° C. prepared by dissolving $LiPF_6$ with a concentration of 1.0 mole per liter in a mixed solvent of ethyl methyl carbonate, diethyl carbonate, and ethylene carbonate in a volume ratio of 50:20:30. The bag was then heat-sealed while the pressure inside the bag was reduced. This produced a nonaqueous electrolyte secondary battery.

<Results of Measurement of Various Physical Properties>

Table 1 shows measurement results of a porosity, a birefringent index, and a phase difference of each of the porous base materials of Production Examples 1 to 4 and Comparative Examples 1 to 3. Table 1 also shows measurement results of resistance values obtained in nonaqueous electrolyte secondary batteries which had been assembled by respectively using the above porous base materials as nonaqueous electrolyte secondary battery separators, the resistance values being as observed after battery assembly.

TABLE 1

| | Porosity (%) | Birefringent Index | Phase Difference (nm) | 10 Hz Resistance (Ω) |
|---|---|---|---|---|
| Production Example 1 | 37 | 0.0019 | 19 | 0.91 |
| Production Example 2 | 50 | 0.0028 | 34 | 0.79 |
| Production Example 3 | 58 | 0.0039 | 78 | 0.82 |
| Production Example 4 | 47 | 0.0012 | 14 | 0.87 |
| Comparative Example 1 | 53 | 0.0053 | 133 | 0.99 |
| Comparative Example 2 | 42 | 0.0060 | 149 | 1.03 |
| Comparative Example 3 | 42 | 0.0058 | 146 | 1.15 |

Figure 2:
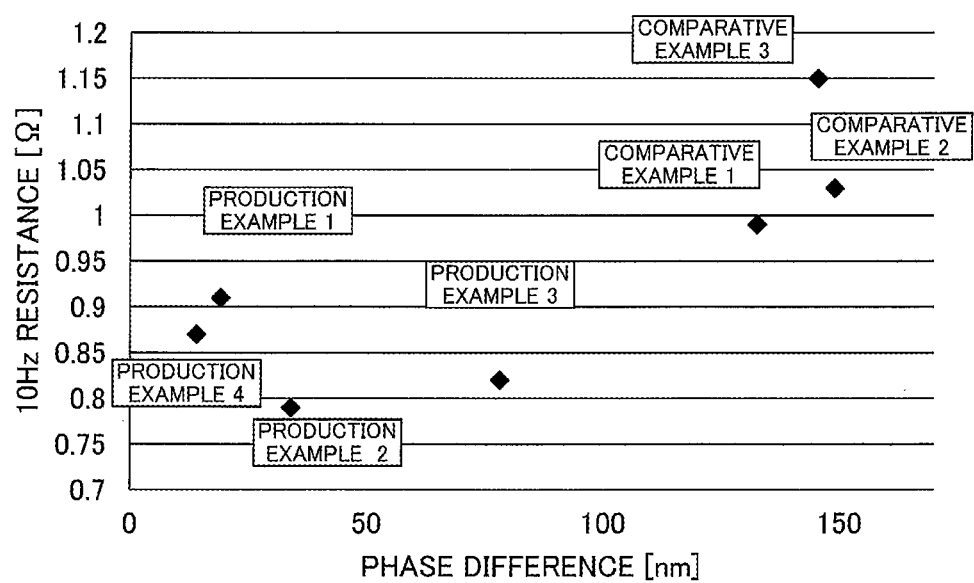
FIG. 2 shows a graph indicating results of measuring a phase difference and a 10 Hz resistance in Production Examples and Comparative Examples.

FIG. 2 shows a graph in which (i) the measurement results of each Production Example and Comparative Example are plotted and (ii) a horizontal axis represents the phase differences shown in Table 1 and a vertical axis represents 10 Hz resistances shown in Table 1. As shown in Table 1 and FIG. 2, the nonaqueous electrolyte secondary batteries, in which the respective porous base materials of Production Examples 1 to 4 having a porosity of 30% to 60% and a phase difference of 80 nm or less were used as nonaqueous electrolyte secondary battery separators, showed low resistance values which were 0.91 Ω or less, after the nonaqueous electrolyte secondary batteries were assembled. Meanwhile, in Comparative Examples 1 to 3, the porous base materials had a porosity of 30% to 60% and a large phase difference of 100 nm or more, and the nonaqueous electrolyte secondary batteries, in which such porous base materials were respectively used as nonaqueous electrolyte secondary battery separators, showed high resistance values which were 0.99 Ω or more, after the nonaqueous electrolyte secondary batteries were assembled. As such, it was confirmed that the phase difference is correlated with the internal resistance of the nonaqueous electrolyte secondary battery as observed after battery assembly. Further, it was found that, in a case where a porous base material having a porosity of 30% to 60% and a phase difference of 80 nm or less is used as a nonaqueous electrolyte secondary battery separator in a nonaqueous electrolyte secondary battery, such a nonaqueous electrolyte secondary battery has an excellent internal resistance as observed after battery assembly.

[Various Methods for Measuring Physical Properties of Laminated Body]

For each of the Examples 1 to 8 and Comparative Examples 4 and 5 below, the following methods were used to measure (i) the amount of crystal form α in the PVDF-based resin contained in the porous layer obtained in each example and (ii) the curl property of the laminated body obtained in each example.

(1) Method for Calculating a Rate

An α rate (%) was measured by the method below, the α rate (%) being a molar ratio (%) of crystal form α in the PVDF-based resin contained in the porous layer in the laminated body produced in each of the Examples and Comparative Examples below with respect to the total amount of the crystal form α and crystal form β contained in the PVDF-based resin.

An 80 mm×80 mm square was cut out from the laminated body. The infrared absorption spectrum of the cutout at wave numbers from 4000 $cm^{-1}$ to 400 $cm^{-1}$ (measurement range) was measured at room temperature (approximately 25° C.) with use of an FT-IR spectrometer (available from Bruker Optics K.K.; model: ALPHA Platinum-ATR) with a resolution of 4 $cm^{-1}$ and 512 times of scanning. Then, from the spectrum measured, the absorption intensity at 765 $cm^{-1}$ (characteristic absorption of crystal form α) and the absorption intensity at 840 $cm^{-1}$ (characteristic absorption of crystal form (β) were determined. The starting point and end point of a waveform formed with the wave number set as a peak were connected with a straight line, where the length between the straight line and the peak wave number (peak top) denoted an absorption intensity. For crystal form α, a maximum possible absorption intensity within the wave number range of 775 $cm^{-1}$ to 745 $cm^{-1}$ was assumed to be the absorption intensity at 765 $cm^{-1}$. For crystal form β, a maximum possible absorption intensity within the wave number range of 850 $cm^{-1}$ to 815 $cm^{-1}$ was assumed to be the absorption intensity at 840 $cm^{-1}$.

The α rate was calculated in accordance with the Formula (4a) below on the basis of a value obtained by (i) determining, as described above, the absorption intensity at 765 $cm^{-1}$ corresponding to crystal form α and the absorption intensity at 840 $cm^{-1}$ corresponding to crystal form β and (ii) multiplying the absorption intensity of crystal form α by 1.681 (correction factor) with reference to Japanese Patent Application Publication, Tokukai, No. 2005-200623.

$$\alpha \text{ rate } (\%) = [1 - \{\text{absorption intensity at 840 } cm^{-1}/(\text{absorption intensity at 765 } cm^{-1} \times \text{correction factor } (1.68\ 1) + \text{absorption intensity at 840 } cm^{-1})\}] \times 100 \ldots \quad (4a)$$

(2) Curl Measurement

An 8 cm×8 cm square was cut out from the laminated body. The cutout was kept at room temperature (approximately 25° C.) and at a dew point of −30° C. for one day. The appearance of the cutout was then evaluated on the basis of the following criterion:

A: No curved ends

B: Opposite ends curved toward each other so as to form a tube shape

Example 1

An N-methyl-2-pyrrolidone (hereinafter referred to also as "NMP") solution (available from Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous base material produced in Production Example 1 so that the PVDF-based resin in the coating solution weighed 6.0 g per square meter. The porous base material, to which the coating solution had been applied, was immersed into 2-propanol while the coating film was wet with the solvent, and was then left to stand still at 25° C. for 5 minutes. This produced a laminated porous film (1-i). The laminated porous film (1-i) produced was further immersed into another batch of 2-propanol while the laminated porous film (1-i) was wet with the above immersion solvent, and was then left to stand still at 25° C. for 5 minutes. This produced a laminated porous film (1-ii). The laminated porous film (1-ii) produced was dried at 65° C. for 5 minutes. This produced a laminated body (1). Table 2 shows the results of evaluation of the laminated body (1) produced.

Example 2

A laminated body (2) was produced by a method similar to the method used in Example 1 except that the porous base material prepared in Production Example 2 was used. Table 2 shows the results of evaluation of the laminated body (2) produced.

Example 3

A porous base material to which a coating solution had been applied, obtained via the same method as in Example 1, was immersed into 2-propanol while the coating film was wet with the solvent, and was then left to stand still at 0° C. for 5 minutes. This produced a laminated porous film (3-i). The laminated porous film (3-i) produced was further immersed into other 2-propanol while the laminated porous film (3-i) was wet with the above immersion solvent, and was then left to stand still at 25° C. for 5 minutes. This produced a laminated porous film (3-ii). The laminated porous film (3-ii) produced was dried at 30° C. for 5 minutes. This produced a laminated body (3). Table 2 shows the results of evaluation of the laminated body (3) produced.

Example 4

A porous base material to which a coating solution had been applied, obtained via the same method as in Example 2, was treated by a method similar to the method used in Example 3. This produced a laminated body (4). Table 2 shows the results of evaluation of the laminated body (4) produced.

Example 5

A porous base material to which a coating solution had been applied, obtained via the same method as in Example 1, was immersed into 2-propanol while the coating film was wet with the solvent, and was then left to stand still at −5° C. for 5 minutes. This produced a laminated porous film (5-i). The laminated porous film (5-i) produced was further immersed into other 2-propanol while the laminated porous film (5-i) was wet with the above immersion solvent, and was then left to stand still at 25° C. for 5 minutes. This produced a laminated porous film (5-ii). The laminated porous film (5-ii) produced was dried at 30° C. for 5 minutes. This produced a laminated body (5). Table 2 shows the results of evaluation of the laminated body (5) produced.

Example 6

A porous base material to which a coating solution had been applied, obtained via the same method as in Example 2, was treated by a method similar to the method used in Example 5. This produced a laminated body (6). Table 2 shows the results of evaluation of the laminated body (6) produced.

Example 7

A porous base material to which a coating solution had been applied, obtained via the same method as in Example 1, was immersed into 2-propanol while the coating film was wet with the solvent, and was then left to stand still at −10° C. for 5 minutes. This produced a laminated porous film (7-i). The laminated porous film (7-i) produced was further immersed into other 2-propanol while the laminated porous film (7-i) was wet with the above immersion solvent, and was then left to stand still at 25° C. for 5 minutes. This produced a laminated porous film (7-ii). The laminated porous film (7-ii) produced was dried at 30° C. for 5 minutes. This produced a laminated body (7). Table 2 shows the results of evaluation of the laminated body (7) produced.

Example 8

A porous base material to which a coating solution had been applied, obtained via the same method as in Example 2, was treated by a method similar to the method used in Example 7. This produced a laminated body (8). Table 2 shows the results of evaluation of the laminated body (8) produced.

Comparative Example 4

A porous base material to which a coating solution had been applied, obtained via the same method as in Example 1, was immersed into 2-propanol while the coating film was wet with the solvent, and was then left to stand still at −78° C. for 5 minutes. This produced a laminated porous film (9-i). The laminated porous film (9-i) produced was further immersed into other 2-propanol while the laminated porous film (9-i) was wet with the above immersion solvent, and was then left to stand still at 25° C. for 5 minutes. This produced a laminated porous film (9-ii). The laminated porous film (9-ii) produced was dried at 30° C. for 5 minutes. This produced a laminated body (9). Table 2 shows the results of evaluation of the laminated body (9) produced.

Comparative Example 5

A porous base material to which a coating solution had been applied, obtained via the same method as in Example 2, was treated by a method similar to the method used in Comparative Example 4. This produced a laminated body (10). Table 2 shows the results of evaluation of the laminated body (10) produced.

TABLE 2

|  | α Rate (%) | Curl Measurement |
|---|---|---|
| Example 1 | 100 | A |
| Example 2 | 100 | A |
| Example 3 | 84 | A |
| Example 4 | 92 | A |
| Example 5 | 63 | A |
| Example 6 | 78 | A |
| Example 7 | 34 | A |
| Example 8 | 45 | A |
| Comparative Example 4 | 21 | B |
| Comparative Example 5 | 29 | B |

[Results]

For the laminated bodies (1) to (8), which were produced in Examples 1 to 8 and each of which included a porous layer containing the PVDF-based resin that contained crystal form α in an amount (a rate) of not less than 34% with respect to the crystal form α and crystal form β combined, the measurement results show that curling was prevented. On the other hand, for the laminated bodies (9) and (10), which were produced in Comparative Examples 4 and 5 and for each of which the a rate was less than 34%, the measurement results show that prominent curling occurred.

The above indicates that curling is prevented in a laminated body in accordance with an embodiment of the present invention which laminated body has an a rate of not less than 34%.

Note that in a nonaqueous electrolyte secondary battery including a laminated body in accordance with an embodiment of the present invention, the internal resistance in the battery, immediately after assembly of the battery, is dependent on (i) the phase difference of a porous base material included in the laminated body, specifically the phase difference with respect to light with a wavelength of 590 nm in a state where the porous base material is impregnated with ethanol, and (ii) the porosity of the porous base material. The laminated bodies produced in Examples 1 to 8 were each produced with use of the porous base material produced in one of Production Examples 1 to 4. As shown in Table 1, the nonaqueous electrolyte secondary batteries using the porous base materials produced in Production Examples 1 to 4 each exhibited a low internal resistivity after battery assembly. It is understood that, for this reason, the nonaqueous electrolyte secondary batteries using the laminated bodies produced in Examples 1 to 8 similarly exhibited superior internal resistivity.

The results of the Production Examples, Examples, and Comparative Examples described above show that the laminated bodies produced in Examples 1 to 8 (laminated bodies in accordance with an embodiment of the present invention) can each impart an excellent internal resistivity to a nonaqueous electrolyte secondary battery including the laminated body as a separator and can each prevent itself from curling.

INDUSTRIAL APPLICABILITY

A laminated body in accordance with an embodiment of the present invention can prevent itself from curling, and is suitably usable in a nonaqueous electrolyte secondary battery.

The invention claimed is:

1. A laminated body, comprising: a porous base material containing a polyolefin-based resin as a main component; and a porous layer disposed on at least one surface of the porous base material, the porous layer containing a polyvinylidene fluoride-based resin, the porous base material having (i) a phase difference of not more than 80 nm with respect to light with a wavelength of 590 nm in a state where the porous base material is impregnated with ethanol and (ii) a porosity within a range of 30% to 60%, the polyvinylidene fluoride-based resin containing crystal form α in an amount of not less than 34 mol % with respect to 100 mol % of a total amount of the crystal form α and crystal form β contained in the polyvinylidene fluoride-based resin, wherein the amount of crystal form α is calculated from an absorption intensity at around 765 $cm^{-1}$ in an IR spectrum of the porous layer, while an amount of crystal form β is calculated from an absorption intensity at around 840 $cm^{-1}$ in the IR spectrum of the porous layer.

2. The laminated body according to claim 1, wherein the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

3. The laminated body according to claim 1, wherein the polyvinylidene fluoride-based resin has a weight-average molecular weight of not less than 200,000 and not more than 3,000,000.

4. The laminated body according to claim 1, wherein the porous layer contains a filler.

5. The laminated body according to claim 4, wherein the filler has a volume-average particle size of not less than 0.01 lam and not more than 10 μm.

6. A nonaqueous electrolyte secondary battery member, comprising: a cathode; a laminated body according to claim 1; and an anode, the cathode, the laminated body, and the anode being arranged in this order.

7. A nonaqueous electrolyte secondary battery, comprising as a separator a laminated body according to claim 1.

* * * * *